US010263657B2

(12) United States Patent
Niemi

(10) Patent No.: US 10,263,657 B2
(45) Date of Patent: Apr. 16, 2019

(54) DETERMINING AND CONTROLLING RADIATION ABSORPTION IN A USER TERMINAL

(71) Applicant: CELLRAID LTD, Oulunsalo (FI)

(72) Inventor: Pasi Niemi, Oulunsalo (FI)

(73) Assignee: CELLRAID LTD (FI)

( * ) Notice: Subject to any disclaimer, the term of this patent is extended or adjusted under 35 U.S.C. 154(b) by 0 days.

(21) Appl. No.: 14/483,754

(22) Filed: Sep. 11, 2014

(65) Prior Publication Data

US 2016/0072538 A1 Mar. 10, 2016

(30) Foreign Application Priority Data

Sep. 10, 2014 (FI) ...................................... 20145790

(51) Int. Cl.
*H04W 52/36* (2009.01)
*H04B 1/3827* (2015.01)

(52) U.S. Cl.
CPC ........ *H04B 1/3838* (2013.01); *H04W 52/367* (2013.01); *H04B 2001/3844* (2013.01)

(58) Field of Classification Search
CPC .... H04B 1/3838; G01N 27/00; H04W 52/367
See application file for complete search history.

(56) References Cited

U.S. PATENT DOCUMENTS

| 2002/0016155 A1* | 2/2002 | Charbonnier | ...... G01R 29/0857 455/67.11 |
| 2004/0248523 A1* | 12/2004 | Nishimura | ............. H01Q 1/245 455/78 |
| 2009/0047998 A1* | 2/2009 | Alberth, Jr. | ........... H04W 52/42 455/562.1 |
| 2010/0203862 A1 | 8/2010 | Friedlander | |
| 2011/0313651 A1* | 12/2011 | Hyde | ....................... G08B 3/10 701/400 |
| 2014/0171141 A1* | 6/2014 | Niskala | ............. H04W 52/0248 455/522 |
| 2015/0057053 A1* | 2/2015 | Zhang | .................. H04B 1/3838 455/575.5 |

FOREIGN PATENT DOCUMENTS

| WO | 2009/149023 A1 | 12/2009 |
| WO | 2012/122113 A1 | 9/2012 |

OTHER PUBLICATIONS

J. C. Bolomey, "Overview of fast SAR assessment techniques," 2008 International Workshop on Antenna Technology: Small Antennas and Novel Metamaterials, Chiba, 2008, pp. 47-50.*
J. Nadobny, M. Szimtenings, D. Diehl, E. Stetter, G. Brinker and P. Wust, "Evaluation of MR-Induced Hot Spots for Different Temporal SAR Modes Using a Time-Dependent Finite Difference Method With Explicit Temperature Gradient Treatment," in IEEE Transactions on Biomedical Engineering, vol. 54, No. 10, pp. 1837-1850, Oct. 2007.*
Finnish Search Report for Finnish Patent Application No. 20145790 dated Apr. 17, 2015.

* cited by examiner

*Primary Examiner* — David Orange
(74) *Attorney, Agent, or Firm* — Barnes & Thornburg LLP

(57) ABSTRACT

An instantaneous value for the specific absorption rate of user terminal is determined, the instantaneous value is compared to a predetermined threshold; and the voice call and data transfer capabilities of the user terminal are controlled on the basis of the comparison and the call connection and data transfer status of the user terminal.

15 Claims, 3 Drawing Sheets

DETERMINING AND CONTROLLING RADIATION ABSORPTION IN A USER TERMINAL

PRIORITY CLAIM

This patent application claims priority to Finnish Patent Application No. 20145790, filed 10 Sep. 2014, the disclosure of which is incorporated herein by reference in its entirety.

FIELD OF THE INVENTION

The exemplary and non-limiting embodiments of the invention relate generally to wireless communication systems. Embodiments of the invention relate especially to apparatuses, methods, and computer program products in determining and controlling radiation absorption in wireless communication systems.

BACKGROUND OF THE INVENTION

The use of mobile communication devices has increased in recent decades. At first mobile phones were used extensively for making voice calls. As technology has developed and made mobile high bandwidth data communication possible, the use of mobile devices for data transfer has increased to such extent that mobile data transfer may be even more common than voice calls. The use of modern data services, including email and social media, often require almost continuous connection to networks. The users of user terminals may have enabled the user terminals to connect to Internet on their own without active user intervention.

The mobile communication devices communicate with communications networks using radio frequency transmissions. The effect of electromagnetic radio frequency radiation on users has been studied in recent years but no conclusive results on the harmful effects have yet been discovered. All radio communication devices must fulfil government issued safety criteria regarding radiation properties. However, users of the devices may want to monitor radiation exposure themselves.

SUMMARY

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to a more detailed description that is presented later.

According to an aspect of the present invention, there is provided an apparatus, comprising: at least one processor; and at least one memory including computer program code, the at least one memory and the computer program code configured to, with the at least one processor, cause the apparatus at least to: determine a specific absorption rate value given to the user terminal; receive information on the power level of signals at least one radio transceiver of a user terminal has received from one or more external transmitters; determine information on the power level of the signals transmitted by the at least one radio transceiver of the user terminal; determine information on the call connection and data transfer status of the user terminal; receive information from one or more sensors of the user terminal; determine an instantaneous value for the specific absorption rate in the basis on the received and determined information and properties of the user terminal; compare the instantaneous value to a predetermined threshold; and control the voice call and data transfer capabilities of the user terminal on the basis of the comparison and the call connection and data transfer status of the user terminal.

According to an aspect of the present invention, there is provided a method comprising: determining a specific absorption rate value given to the user terminal; receiving information on the power level of signals at least one radio transceiver of a user terminal has received from one or more external transmitters; determining information on the power level of the signals transmitted by the at least one radio transceiver of the user terminal; determining information on the call connection and data transfer status of the user terminal; receiving information from one or more sensors of the user terminal; determining an instantaneous value for the specific absorption rate on the basis on the received and determined information and properties of the user terminal; comparing the instantaneous value to a predetermined threshold; and controlling the voice call and data transfer capabilities of the user terminal on the basis of the comparison and the call connection and data transfer status of the user terminal.

According to an aspect of the present invention, there is provided a computer program product embodied on a distribution medium readable by a computer and comprising program instructions which, when loaded into an apparatus, execute the steps: determining a specific absorption rate value given to the user terminal; receiving information on the power level of signals at least one radio transceiver of a user terminal has received from one or more external transmitters; determining information on the power level of the signals transmitted by the at least one radio transceiver of the user terminal; determining information on the call connection and data transfer status of the user terminal; receiving information from one or more sensors of the user terminal; determining an instantaneous value for the specific absorption rate on the basis on the received and determined information and properties of the user terminal; comparing the instantaneous value to a predetermined threshold; and controlling the voice call and data transfer capabilities of the user terminal on the basis of the comparison and the call connection and data transfer status of the user terminal.

LIST OF THE DRAWINGS

In the following the invention will be described in greater detail by means of preferred embodiments with reference to the accompanying drawings, in which FIG. 1 illustrates a simplified view of a communication environment;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®, known also as E-UTRA), long term evolution advanced (LTE-A®), Wireless Local Area Network (WLAN, WiFi) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Embodiments of the invention are applicable to apparatuses in communication system or any combination of different communication systems that support required functionalities.

Figure 1:
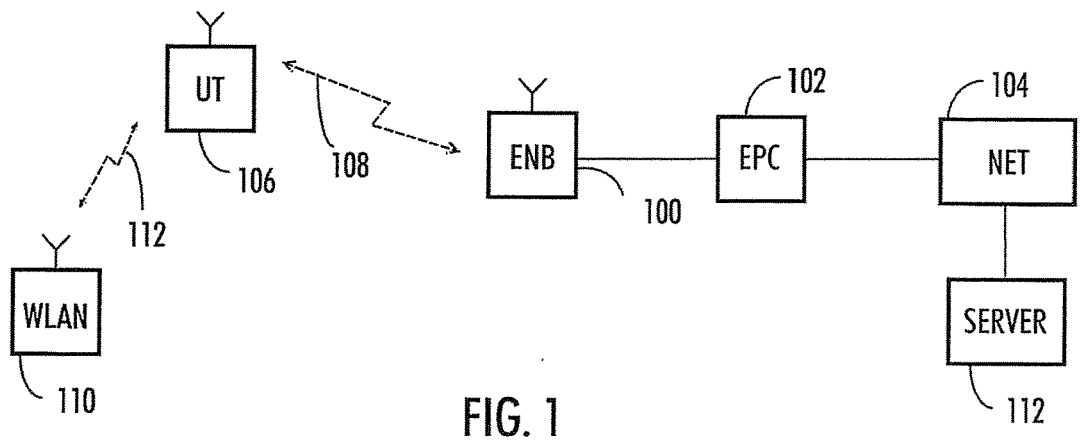

FIG. 1 illustrates an example of an access architecture based on a long term evolution advanced (LTE Advanced, LTE-A) system. The LTE-A system is one example of a system where embodiments of the invention may be applied.

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

FIG. 1 shows an eNodeB 100 connected to an Evolved Packet Core EPC 102 of a communication system. The eNodeB's form a part of the radio access network (RAN) of the communication system.

The eNodeB 100, which may also be called a base station of the radio system, may host the functions for Radio Resource Management: Radio Bearer Control, Radio Admission Control, Connection Mobility Control, Dynamic Resource Allocation (scheduling). Depending on the system, the counterpart on the EPC side can be a serving gateway (S-GW, routing and forwarding user data packets), packet data network gateway (P-GW, for providing connectivity of user devices (UEs) to external packet data networks), and/or mobile management entity (MME), etc. The MME (not shown) is responsible for the overall user terminal control in mobility, session/call and state management with assistance of the eNodeBs through which the user terminals may connect to the network.

The communication system is also able to communicate with other networks, such as a public switched telephone network or the Internet 104. It should be appreciated that eNodeBs or their functionalities may be implemented by using any node, host, server or access point etc. entity suitable for such a usage.

The user terminal UT 106 (also called user device, user equipment, terminal device, etc.) illustrates one type of an apparatus which communicates 108 with the communication network. The communication may comprise both voice calls and data traffic, such as a data connection to a network server 112, for example.

The user terminal typically refers to a portable computing device that includes wireless mobile communication devices operating with or without a subscriber identification module (SIM), including, but not limited to, the following types of devices: a mobile station (mobile phone), smartphone and personal digital assistant (PDA), for example.

The user terminal is configured to perform one or more of user equipment functionalities. The device may also be called a subscriber unit, mobile station, remote terminal, access terminal, user equipment (UE) just to mention but a few names or apparatuses.

Further, although the apparatuses have been depicted as single entities, different units, processors and/or memory units (not all shown in FIG. 1) may be implemented.

The user terminal 106 may be in radio connection with one or more external transceivers. One type of the external transceiver is the eNodeB 100. In addition to the eNodeB 100, the user terminal 106 may be in connection with one or more wireless network base stations or nodes 110. The base stations 110 may be WLAN or WiFi base stations or routers, for example. In addition, the user terminal may have a Bluetooth connection with another device.

The radio connections between user terminals and base stations or eNodeBs utilise various frequency bands which are standardised and controlled by international treaties and local authorities. For example, GSM systems typically utilise 450, 900 and 1800 MHz frequency bands, UMTS systems typically utilise 800, 1900 and 2100 MHz frequency bands and WLAN or WiFi typically utilise various frequency bands between 2.4 GHz and 5.9 GHz. The mentioned frequency bands are merely illustrative examples as also other frequency bands may be used by the systems in different countries.

Effects of the electromagnetic radiation on users caused by mobile communication devices have been studied since wireless communications systems have been taken into use. The transmitted power levels of the communication devices vary according to propagation effects and the distances between the transceivers. A user terminal situated at a border of the service area of a base station may transmit using considerably greater transmit power compared to a user terminal situated close to the base station. To ensure that health hazards are avoided governments have issued certain limits to the allowed transmit powers of both user terminals and base stations. User terminals are manufactured and communication systems are designed taking these limitations into account.

However, users of the user terminals may want to monitor themselves the radiation exposure they receive from the use of the user terminals. An embodiment of the invention provides an apparatus configured to determine an instantaneous value for specific absorption rate of a user terminal of a wireless communication system. The apparatus may be configured to control the operations of the user terminal on the basis of determined information.

A unit used to denote the measure of the rate at which energy is absorbed by a human body when exposed to a electromagnetic field caused by radio communication is called the specific absorption rate (SAR). Each user terminal type on the market is tested and the SAR value for each type of user terminal is published. The SAR measurements are made according to a predetermined internationally accepted standard. Legal bodies of most countries have issued limits to the maximum SAR values for user terminals. In Europe, the maximum SAR value allowed is 2.0 W/kg in 10 g of tissue. In the US, the maximum SAR value allowed is 1.6 W/kg in 1 g of tissue. These two values are calculated differently and cannot be compared. The SAR values are measured both when the user terminal is held by a human's head and when the user terminal is by the human's body.

Figure 2:
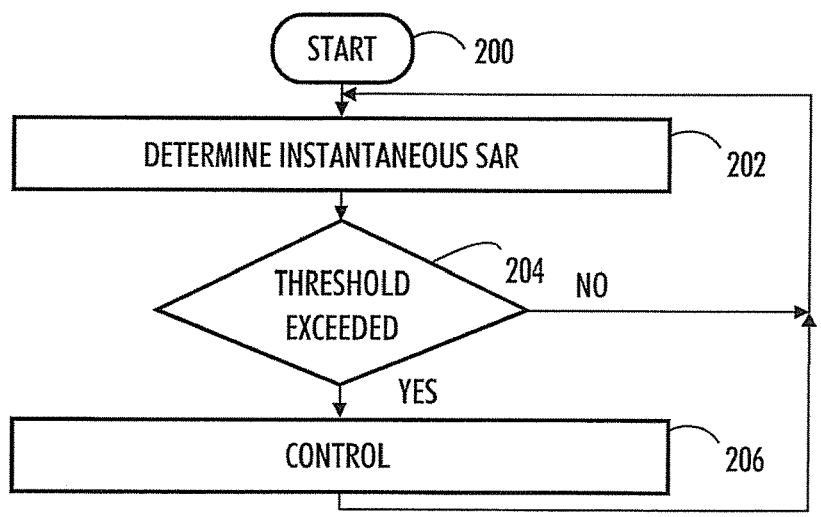
FIG. 2 is a flowchart illustrating an example embodiment.

FIG. 2 is a flowchart illustrating a simplified example embodiment of the invention. The example illustrates the operation of an apparatus configured to determine the amount of electromagnetic radiation the user of the user terminal is exposed to and control the voice call and data transfer capabilities of the user terminal. In an embodiment, the apparatus may be the user terminal or a part of a user terminal running suitable software configured to control the execution of following steps. The example starts at step 200.

In step 202, the apparatus is configured to determine an instantaneous value for the specific absorption rate of a user terminal. Details of the determination are described below.

In step 204, the apparatus is configured to compare the determined instantaneous value for SAR to a predetermined threshold value. In an embodiment, the predetermined threshold value is the maximum SAR limit allowed for user terminals.

In step 206, the apparatus is configured to control the voice call and data transfer capabilities of the user terminal on the basis of the comparison.

One problem related to the maximum allowed SAR values described above is that they have been defined in the time when user terminals were used almost exclusively to talking, i.e. phone calls. In recent years data traffic has increased greatly because of the advanced made in communication system technology which enable the user terminals to communicate with the fixed network at high data rates. In practise, there is hardly any difference between the data rates of mobile communication systems and fixed networks. Especially the use of social media services and cloud storages has increased. The user terminals may be configured to connect to the Internet and transmit and/or receive data without active user involvement. Therefore, even when the user terminal is in a pocket near the user's body there may be ongoing data transfer happening.

Depending on the location of the user and distance to a base station the user terminal may use maximum allowed transmission power without the user actually being aware of the situation. For example, even when a base station is relatively near the user terminal may transit at a high power if the user is located in environment having large constructions between the user and the base station.

Figures 3, 4:
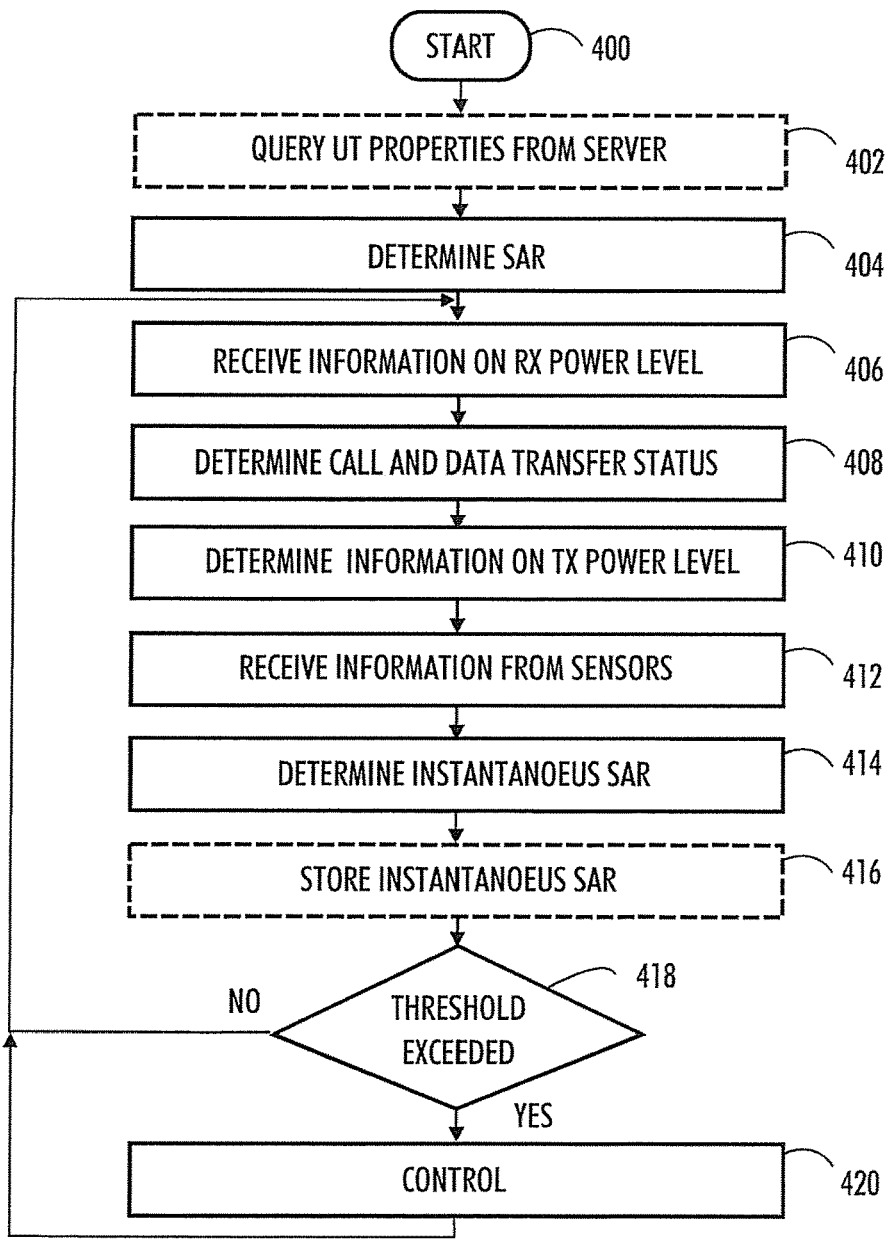
FIG. 3 illustrates results of the instantaneous SAR measurement.
FIGS. 4, 5 and 6 are flowcharts illustrating example embodiments.

For example, assume that the user is entering an underground parking lot and the user terminal in the pocket of the user is currently transmitting some files to a cloud storage. FIG. 3 illustrates results of the instantaneous SAR measurement. The maximum allowed SAR value for the user terminal in the US is 1.6 W/Kg in 1 g of tissue. This value assumes that the user terminal is 1 cm away from the body of the user. In practise however, the user terminal may be right beside the body when the terminal is held in a pocket. FIG. 3 shows the maximum allowed SAR 1.6 W/Kg as a horizontal line. X-axis denotes time. The user is outside walking towards an underground parking lot and the instantaneous SAR stays low. At point 302 in time, the user enters the underground parking lot and the user terminal is forced to increase transmission power to reach the base station the terminal is connected to. The instantaneous SAR increases over the allowed SAR limit, because the terminal is closer to body than 1 cm. When the user leaves the underground parking lot at point 304 in time, the SAR falls again to a lower value.

In an embodiment, the data traffic of the user terminal may be controlled to avoid the large instantaneous SAR values, such as the values between time instants 302, and 304 in FIG. 3. In an embodiment, software running in the user terminal may be configured to detect that the instantaneous SAR value is rising given threshold level in time instant 302. If the software detects that the user terminal is transmitting data, the transmission may be interrupted or limited temporarily, for example. Based on the information on the power level of the signal received from the base station and the location of the user terminal, for example, the software may determine that at time instant 304 the instantaneous SAR value will be below the threshold and the data transmission may be enabled. The terminal properties and quality of the signal received from the base station may be taken into account in the determination.

Thus in an embodiment, the possible instantaneous SAR value is estimated when the transmission of the user terminal is interrupted or limited temporarily. When the possible instantaneous SAR value falls below a given limit, the transmission of the user terminal is enabled.

FIG. 4 is a flowchart illustrating a simplified example embodiment of the invention. The example illustrates the operation of an apparatus configured to determine the amount of electromagnetic radiation the user of the user terminal is exposed to and control the voice call and data transfer capabilities of the user terminal. In an embodiment, the apparatus may be the user terminal or a part of a user terminal running suitable software configured to control the execution of following steps. The example starts at step 400.

In step 402, the apparatus is configured to determine the model of the user terminal, transmit a query to a network server regarding the properties of the user terminal and receive from the server information on the properties of the user terminal.

In step 404, the apparatus is configured to determine the specific absorption rate (SAR) value given to the user terminal. In an embodiment, the SAR value may be part of the properties received from a server in step 402.

In step 406, the apparatus is configured to receive information on the power level of signals at least one radio transceiver of a user terminal has received from one or more external transmitters. In an embodiment, the controller of the apparatus may query from the radio modem or radio modems of the transceiver of the user terminal the strength of the signal or signals received from base stations or eNodeB's the user terminal is connected to.

In step 408, the apparatus is configured to determine information on the call connection and data transfer status of the user terminal. The apparatus may determine whether there is an ongoing call or data transfer. The properties of the data transfer may be determined, i.e. if the data traffic is utilising a cellular connection, WLAN (WiFi) or another connection.

In step 410, the apparatus is configured to determine information on the power level of the signals transmitted by the at least one radio transceiver of the user terminal. In an embodiment, the controller of the apparatus is configured to determine the information based on measurements made from the outputs of the radio modem or modems of the transceiver of the user terminal. In an embodiment, the controller of the apparatus is configured to estimate the information based on the power level of the signals received by the user terminal and information on the system the user terminal is communicating with and the user terminal propertied. The call connection and data transfer status may be taken into account.

In step 412, the apparatus is configured to receive information from one or more sensors of the user terminal. Examples of the one or more sensors of the user terminal comprise proximity, acceleration, location and temperature sensors. The use of sensors is explained further below.

In step 414, the apparatus is configured to determine an instantaneous value for the specific absorption rate on the basis on the received and determined information and properties of the user terminal.

In an embodiment, the apparatus first determines an estimate for the amount of electromagnetic radiation on the basis on the received and determined information and the properties of the user terminal. The determined amount electromagnetic radiation may comprise information on the radiation originating from the external transmitter and the radio transceiver of the user terminal. Thus, powers of both the received and transmitted signal may be taken into account.

Next, the apparatus may be configured to determine an estimate for the user radiation exposure. In an embodiment, the information received from the sensors may be utilised in determining the estimate for the user radiation exposure on the basis of estimate for the amount of electromagnetic radiation. The sensors may be used to determine where the user terminal is located in relation to the user of the terminal. If the sensors indicate that the terminal is located away from the user it may be determined that the amount of radiation the user is exposed to is small compared to the amount of electromagnetic radiation. This is due to the attenuation due to distance. This may be the case when there is an on-going data transfer but the proximity and acceleration sensors indicate that the terminal is stable, for example on a table. The sensors may also indicate that the user terminal is in a pocket, for example. If the user terminal is held by the ear of the user, as may be the case when there is an on-going call and no hands-free equipment is in use, the amount of radiation is greater as the distance between the user terminal antenna and user is shorter.

The location sensor may comprise a satellite location receiver such as GPS (Global Positioning System) or Glonass, for example. The location of the user terminal may be determined and stored in connection with the amount of electromagnetic radiation experienced by the user.

The instantaneous value for the specific absorption rate may be determined on the basis of the above determined values. The maximum SAR value of the user terminal may be utilised in the determination.

In an embodiment, the instantaneous SAR is estimated on the basis of the transmission power and known SAR characteristics of the user terminal and the location of the user terminal in relation to the user's body. If the maximum transmission power of a user terminal is known for different access methods (GSM, UMTS, LTE, for example), and the maximum SAR for the user terminal is known, the instantaneous SAR may be estimated utilising the information on the location of the terminal.

In step 416, the apparatus is configured to store the determined instantaneous value for the specific absorption rate. The value may be stored in the memory of the user terminal. Also related to the SAR data may be stored, such as time, location, transmit/received signal power data, for example. In an embodiment, the value is stored in a network server. In an embodiment, the SAR values are stored in the user terminal memory and transmitted to a network server at given time intervals. For example, the determined information may be sent to the network server once per day.

In step 418, the apparatus is configured to compare the determined instantaneous value for SAR to a predetermined threshold value. In an embodiment, the predetermined threshold value is the maximum SAR limit allowed for user terminals. The predetermined threshold value may be stored in the user terminal memory. It may be a pre-programmed value, a value given by the user or a value downloaded from a network server.

In step 420, the apparatus is configured to control the voice call and data transfer capabilities of the user terminal on the basis of the comparison and the call connection and data transfer status of the user terminal.

Figure 5:
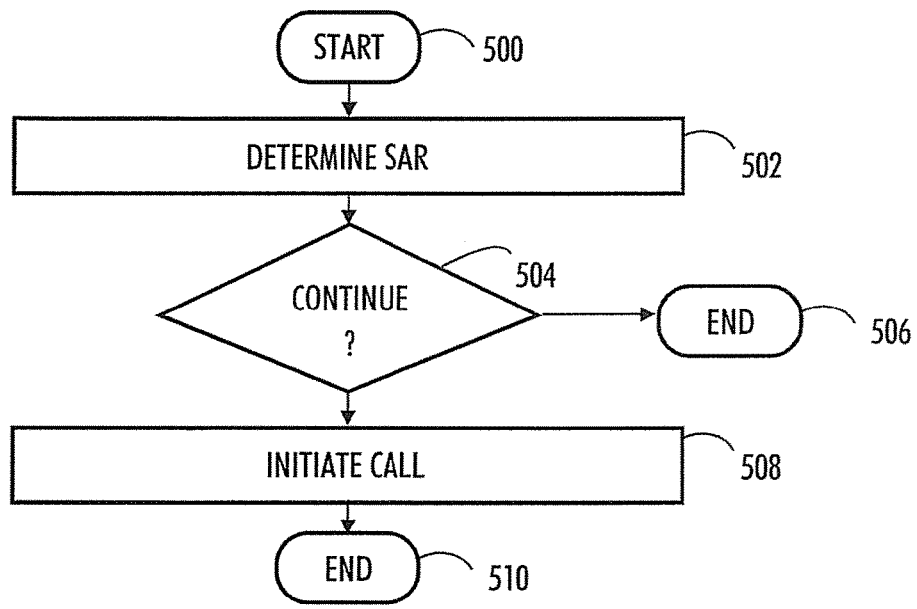

FIG. 5 is a flowchart illustrating an example embodiment. The flowchart gives an example how the apparatus may control voice call capabilities of a user terminal. In an embodiment, the apparatus may be the user terminal or a part of a user terminal running suitable software configured to control the execution of following steps. The example starts at step 500.

In step 502, the apparatus is configured to determine an estimate for the instantaneous SAR.

In step 504, the apparatus is configured to determine that the determined SAR may larger than a predetermined threshold value and that the user is about to initiate a voice call at this potential high SAR situation. The apparatus may be configured to prompt the user to confirm the initiation of a voice call when instantaneous SAR is larger than a predetermined threshold value.

If the user selects not to continue, the process ends in step 506.

If the user selects to continue with the voice call, the call is initiated in step 508.

The embodiment ends in step 510.

In an embodiment, when the user is about to initiate a voice call at a high radiation situation, the apparatus may be configured to alert the user with a message or vibration indicating that making a voice call would lead to a high radiation exposure.

This kind of situation may arise for example when the user is located underground where the radio path to the base station serving the user terminal is obscured by buildings. The user may select to postpone the call until a more suitable location is reached.

Figure 6:
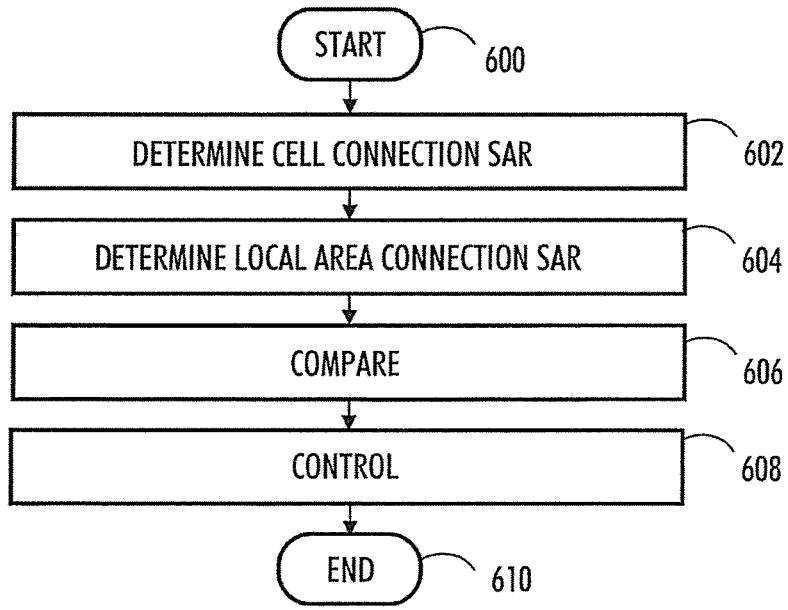

FIG. 6 is a flowchart illustrating an example embodiment. In an embodiment, the apparatus may be the user terminal or a part of a user terminal running suitable software configured to control the execution of following steps. The example starts at step 600.

In step 602, the apparatus is configured to estimate SAR caused by a cellular connection.

In step 604, the apparatus is configured to estimate SAR caused by local area network connection.

In step 606, the apparatus is configured to compare the estimated SAR values.

In step 608, the apparatus is configured to control the data transfer capabilities of the user terminal by controlling data transfer to utilise the connection causing smaller SAR.

The embodiment ends in step 610.

Figure 7:
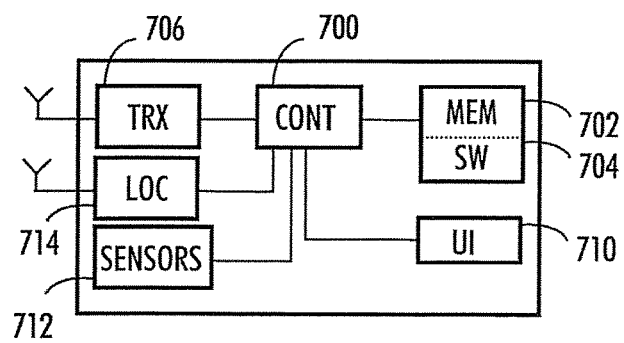
FIG. 7 illustrates a simplified example of an apparatus in which some embodiments of the invention may be applied.

FIG. 7 illustrates an embodiment. The figure illustrates a simplified example of an apparatus in which embodiments of the invention may be applied. In some embodiments, the apparatus is a user terminal or a part of a user terminal.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry or controller 700 configured to control at least part of the operation of the apparatus. The control circuitry 700 is configured to execute one or more applications.

The apparatus may comprise a memory 702 for storing data and/or applications. Furthermore the memory may store software 704 executable by the control circuitry 700. The memory may be integrated in the control circuitry.

The apparatus may comprise a communication interface 706. The communication interface is operationally connected to the control circuitry 700. The communication interface may comprise a transceiver which enables the apparatus to communicate with other apparatuses and be in connection with the internet, for example. The communication interface may comprise several radio units enabling the apparatus to utilise for communication a cellular network such as LTE, LTE-A, UMTS, or a wireless network (WLAN, WiFi, WiMAX).

The software 704 may comprise a computer program comprising program code means adapted to cause the control circuitry 700 of the apparatus to control and communicate with the communication interface 706.

The apparatus may further comprise user interface 710 operationally connected to the control circuitry 700. The interface may comprise a (touch sensitive) display, a keypad, a microphone, and a speaker, for example.

The apparatus may further comprise sensors 712. The sensors may comprise proximity, acceleration, location and temperature sensors, for example. The location sensor also may be realized with a satellite positioning receiver 714 which enables the controller to determine the location of the apparatus.

In an embodiment, the applications may cause the apparatus to determine a specific absorption rate value given to the user terminal; receive information on the power level of signals at least one radio transceiver of a user terminal has received from one or more external transmitters; determine information on the power level of the signals transmitted by the at least one radio transceiver of the user terminal; determine information on the call connection and data transfer status of the user terminal; receive information from one or more sensors of the user terminal; determine an instantaneous value for the specific absorption rate on the basis on the received and determined information and properties of the user terminal; compare the instantaneous value to a predetermined threshold; and control the voice call and data transfer capabilities of the user terminal on the basis of the comparison and the call connection and data transfer status of the user terminal.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or control circuitries able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as the technology advances, the inventive concept can be implemented in various ways. The invention and its embodiments are not limited to the examples described above but may vary within the scope of the claims.

The invention claimed is:

1. A user terminal, comprising:
   at least one processor; and
   at least one memory including computer program code, the at least one memory and the computer program code configured to, with the at least one processor, cause the user terminal at least to:
   determine, using the computer program code, properties of the user terminal;
   receive, using the computer program code, receipt-signal power levels for signals received by at least one radio transceiver of the user terminal from one or more transmitters by querying modems for signal power levels received from eNodeBs and wireless local area networks;
   determine, using the computer program code, transmit-signal power level information for signals transmitted by the at least one radio transceiver of the user terminal based on the receipt-signal power levels;
   determine, using the computer program code, call connection information and data transfer status of the user terminal;
   receive, using the computer program code, sensor information from one or more sensors of the user terminal;
   determine, using the computer program code, an amount of electromagnetic radiation comprising the electromagnetic radiation originating from the transmit-signals and from the receipt-signals
   determine, using the computer program code, value for a specific absorption rate for the user terminal by adjusting the determined amount of electromagnetic radiation based on the received sensor information, and determined properties of the user terminal;
   compare, using the computer program code, the determined value for the user terminal to a predetermined threshold; and
   control, using the computer program code, voice call and data transfer capabilities of the user terminal based on the comparison and the determined call connection information and data transfer status of the user terminal,
   wherein the control of the voice call and data transfer capabilities of the user terminal is performed when the determined specific absorption rate value for the user terminal is larger than the predetermined threshold to utilize a connection causing a smaller specific absorption rate value for the user terminal.

2. The user terminal of claim 1, wherein the at least one memory and the computer program code are further configured to, with the at least one processor, cause the user terminal to control, using the computer program code, the data transfer capabilities by disabling data transfer in response to the determination that the determined specific absorption rate value for the user terminal is larger than the predetermined threshold.

3. The user terminal of claim 1, wherein the at least one memory and the computer program code are further configured to, with the at least one processor, cause the user terminal to:
   determine, using the computer program code, the specific absorption rate value for the user terminal caused by exposure of a user of the user terminal to a cellular connection;
   determine, using the computer program code, a specific absorption rate value for the user terminal caused by exposure of the user of the user terminal to a local area network connection; and
   control the data transfer capabilities by controlling data transfer to utilize one of the cellular connection or the local area network connection causing the smaller for the specific absorption rate value for the user terminal.

4. The user terminal of claim 1, wherein the at least one memory and the computer program code are further configured to, with the at least one processor, cause the user terminal to:
   determine, using the computer program code, a position of the user terminal in relation to the user of the user terminal based on the sensor information received from the one or more sensors of the user terminal; and
   take, using the computer program code, the determined position into account when determining the properties of the user terminal.

5. The user terminal of claim 1, wherein the at least one memory and the computer program code are further configured to, with the at least one processor, cause the user terminal to control the data transfer capabilities by allowing data transfer only periodically.

6. The user terminal of claim 1, wherein the at least one memory and the computer program code are further configured to, with the at least one processor, cause the user terminal to:
   determine, using the computer program code, a model of the user terminal;
   transmit, using the computer program code, a query to a network server regarding the properties of the user terminal; and
   receive, using the computer program code, from the network server information indicating the properties of the user terminal.

7. The user terminal of claim 1, wherein the at least one memory and the computer program code are further configured to, with the at least one processor, cause the user terminal to store the determined value for the specific absorption rate for the user terminal and/or transmit the determined specific absorption rate value for the user terminal to a network server.

8. A method performed within a user terminal that comprises at least one processor, and at least one memory including computer program code, wherein the at least one memory and the computer program code cause the user terminal to perform the method comprising:
   determining, using the computer program code, properties of the user terminal;
   receiving, using the computer program code, receipt-signal power levels for signals received by at least one radio transceiver of the user terminal from one or more transmitters by querying modems for signal power levels received from eNodeBs and wireless local area networks;
   determining, using the computer program code, transmit-signal power level information for signals transmitted by the at least one radio transceiver of the user terminal based on the receipt-signal power levels;
   determining, using the computer program code, call connection information and data transfer status of the user terminal;

receiving, using the computer program code, sensor information from one or more sensors of the user terminal;

determining, using the computer program code, an amount of electromagnetic radiation comprising the electromagnetic radiation originating from the transmit-signals and from the receipt-signals determining, using the computer program code, a specific absorption rate value for the user terminal by adjusting the determined amount of electromagnetic radiation based on the received sensor information, and determined properties of the user terminal;

comparing, using the computer program code, the value to a predetermined threshold; and controlling, using the computer program code, voice call and data transfer capabilities of the user terminal based on the comparison and the determined call connection information and data transfer status information of the user terminal, wherein the control of the voice call and data transfer capabilities of the user terminal is performed when the determined specific absorption rate value for user terminal is larger than the predetermined threshold to utilize a connection causing a smaller specific absorption rate value for the user terminal.

9. The method of claim 8, further comprising controlling, using the computer program code, the data transfer capabilities by disabling data transfer in response to a determination that the determined specific absorption rate value for the user terminal is larger than the predetermined threshold.

10. The method of claim 8, further comprising:

determining, using the computer program code, a specific absorption rate value for the user terminal caused by exposure of a user of the user terminal to a cellular connection;

determining, using the computer program code, a specific absorption rate value for the user terminal caused by exposure of the user of the user terminal to a local area network; and controlling, using the computer program code, the data transfer capabilities by controlling data transfer to utilize one of the cellular connection or the local area connection causing the smaller specific absorption rate value for the user terminal.

11. The method of claim 8, further comprising:

determining, using the computer program code, a position of the user terminal in relation to the user of the user terminal based on the sensor information received from the one or more sensors of the user terminal; and taking, using the computer program code, the determined position into account when determining the properties of the user terminal.

12. The method of claim 8, wherein further controlling the data transfer capabilities is performed by allowing data transfer only periodically.

13. The method of claim 8, further comprising:

determining, using the computer program code, a model of the user terminal;

transmitting, using the computer program code, a query to a network server regarding the properties of the user terminal; and receiving, using the computer program code, from the network server information on the properties of the user terminal.

14. The method of claim 8, further comprising storing, using the computer program code, the determined specific absorption rate value for the user terminal and/or transmitting the determined specific absorption rate value for the user terminal to a network server.

15. A computer program product embodied on a non-transitory distribution medium readable by a computer and comprising program instructions which, when loaded into a user terminal that comprises at least one processor, and at least one memory including the computer program instructions, cause the user terminal to execute the operations of:

determining, using the computer program instructions, properties of the user terminal;

receiving, using the computer program instructions, receipt-signal power levels for signals received by at least one radio transceiver of the user terminal from one or more transmitters by querying modems for signal power levels received from eNodeBs and wireless local area networks;

determining, using the computer program instructions, transmit-signal power level information for signals transmitted by the at least one radio transceiver of the user terminal based on the receipt-signal power levels;

determining, using the computer program instructions, call connection and data transfer status of the user terminal;

receiving, using the computer program instructions, sensor information from one or more sensors of the user terminal;

determining, using the computer program code, an amount of electromagnetic radiation comprising the electromagnetic radiation originating from the transmit-signals and from the receipt-signals determining, using the computer program instructions, a specific absorption rate value for the user terminal by adjusting the determined amount of electromagnetic radiation based on received sensor information, and determined properties of the user terminal;

comparing, using the computer program instructions, the determined specific absorption rate value to a predetermined threshold; and controlling, using the computer program instructions, voice call and data transfer capabilities of the user terminal based on the comparison and the determined call connection information and data transfer status of the user terminal, wherein the control of the voice call and data transfer capabilities of the user terminal is performed, using the computer program instructions, when the determined specific absorption rate value for the user terminal is larger than the predetermined threshold to utilize a connection causing a smaller specific absorption rate value for the user terminal.

* * * * *